United States Patent
Abedini et al.

(10) Patent No.: US 11,864,176 B2
(45) Date of Patent: Jan. 2, 2024

(54) EXTENDED SLOT AGGREGATION SCHEDULING IN IAB NETWORK

(71) Applicant: QUALCOMM Incorporated, San Diego, CA (US)

(72) Inventors: Navid Abedini, Somerset, NJ (US); Jianghong Luo, Skillman, NJ (US); Kapil Gulati, Hillsborough, NJ (US); Luca Blessent, Whitehouse Station, NJ (US); Tao Luo, San Diego, CA (US); Junyi Li, Chester, NJ (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 16/937,292

(22) Filed: Jul. 23, 2020

(65) Prior Publication Data
US 2021/0029729 A1 Jan. 28, 2021

Related U.S. Application Data

(60) Provisional application No. 62/879,079, filed on Jul. 26, 2019.

(51) Int. Cl.
*H04W 72/12* (2023.01)
*H04W 72/04* (2023.01)
(Continued)

(52) U.S. Cl.
CPC ....... *H04W 72/1268* (2013.01); *H04L 5/0055* (2013.01); *H04W 72/0446* (2013.01);
(Continued)

(58) Field of Classification Search
CPC .......... H04W 72/1268; H04W 72/042; H04W 72/0446; H04W 76/27; H04W 88/14;
(Continued)

(56) References Cited

U.S. PATENT DOCUMENTS 10,645,658 B2 * 5/2020 Chen .................... H04W 72/042
2004/0198404 A1 * 10/2004 Attar ..................... H04W 52/32
370/342

(Continued)

FOREIGN PATENT DOCUMENTS

WO 2019194889 A1 10/2019
WO 2020092596 A1 5/2020

OTHER PUBLICATIONS

Huawei et al., "Evaluation on the Dynamic and Flexible Resource Allocation in IAB", 3GPP Draft, R1-1801403, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051397543, 6 Pages, Retrieved from the Internet:URL:http://www.3gpp.org/ftp/tsg%5Fran/WG1%5FRL1/TSGR1%5F92/Docs/ [retrieved on Feb. 17, 2018], Sections 1 and 2.

(Continued)

*Primary Examiner* — Hoang-Chuong Q Vu
(74) *Attorney, Agent, or Firm* — QUALCOMM Incorporated

(57) ABSTRACT

Aspects of the present disclosure provide techniques of allocating time resources (or slots) based on a flexible pattern that allows allocation of a set of non-continuous time slots resources in an integrated access and backhaul (IAB) system. In one example, the aggregation pattern may be indicated via a single downlink control information (DCI) message that carries explicit information regarding non-continuous time slot allocation. Features of the present disclosure may also include techniques to allow for early termination of transmission between the first node and the second node when the receiver (e.g., second node) successfully receives the data channel before the end of aggregated transmission. In such situation, the first node and the second (Continued)

node may cease transmission after reception of an acknowledgement (ACK) message that may allow the second node to utilize the subsequent time slots for communication with its own children on the next hop (e.g., third node).

29 Claims, 6 Drawing Sheets

(51) Int. Cl.
| | | |
|---|---|---|
| *H04L 5/00* | (2006.01) | |
| *H04W 76/27* | (2018.01) | |
| *H04W 88/14* | (2009.01) | |
| *H04W 72/1268* | (2023.01) | |
| *H04W 72/0446* | (2023.01) | |
| *H04W 72/23* | (2023.01) | |

(52) U.S. Cl.
CPC ........... *H04W 72/23* (2023.01); *H04W 76/27* (2018.02); *H04W 88/14* (2013.01)

(58) Field of Classification Search
CPC .............. H04W 88/04; H04W 72/1289; H04L 5/0055; H04L 5/0053; H04L 5/0094; H04L 1/1887; H04L 1/1854; H04B 7/15542

See application file for complete search history.

(56) References Cited

U.S. PATENT DOCUMENTS

| | | | | |
|---|---|---|---|---|
| 2007/0263740 A1* | 11/2007 | Kwon | ................... | H04L 1/1887 375/260 |
| 2008/0125137 A1* | 5/2008 | Rajkotia | ............... | H04L 1/0002 455/452.2 |
| 2012/0230245 A1* | 9/2012 | Ostergaard | ............ | H04W 72/14 370/315 |
| 2012/0281675 A1* | 11/2012 | Liang | .................... | H04L 1/0053 370/335 |
| 2018/0062724 A1* | 3/2018 | Onggosanusi | ........ | H04L 5/0053 |
| 2019/0132862 A1* | 5/2019 | Jeon | ................... | H04W 72/1289 |
| 2019/0200355 A1* | 6/2019 | Baldemair | .......... | H04L 27/2607 |
| 2019/0274153 A1* | 9/2019 | Park | ...................... | H04L 5/0094 |
| 2019/0313433 A1* | 10/2019 | Abedini | ................ | H04L 5/0044 |
| 2019/0349079 A1* | 11/2019 | Novlan | ................ | H04B 7/2606 |
| 2019/0373607 A1* | 12/2019 | Zhang | .................... | H04W 72/23 |
| 2020/0053698 A1* | 2/2020 | Chen | ................. | H04W 72/0446 |
| 2020/0107301 A1* | 4/2020 | Chen | .................... | H04L 1/1854 |
| 2020/0389874 A1* | 12/2020 | Lin | ..................... | H04W 72/042 |
| 2021/0235503 A1* | 7/2021 | Irukulapati | ....... | H04W 74/0833 |
| 2021/0352731 A1* | 11/2021 | Yang | .................. | H04L 1/1896 |
| 2022/0007403 A1* | 1/2022 | Li | ..................... | H04W 72/1289 |
| 2022/0061005 A1* | 2/2022 | Ko | ........................ | H04W 4/40 |
| 2022/0086884 A1* | 3/2022 | Ronkainen | ............ | H04W 40/22 |
| 2022/0191893 A1* | 6/2022 | Miao | .................. | H04B 7/15542 |

OTHER PUBLICATIONS

International Search Report and Written Opinion—PCT/US2020/043569—ISA/EPO—dated Oct. 27, 2020.

Vivo: "Enhancements of Uu Link to Control Sidelink", 3GPP Drait, 3GPP TSG RAN WG1 #96, R1-1901688, Enhancements of Uu Link to Control Sidelink, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051599384, 8 pages.

ZTE: "Overview of Physical Layer Enhancements for IAB", 3GPP Draft, 3GPP TSG RAN WG1 Meeting #93, R1-1806024, 3rd Generation Partnership Project (3GPP), Mobile Competence Centre, 650, Route Des Lucioles, F-06921 Sophia-Antipolis Cedex, France, vol. RAN WG1, No. Busan, Korean, May 21, 2018-May 25, 2018, May 12, 2018 (May 12, 2018), XP051462292, 9 pages, Retrieved from the Internet: URL: http://www.3gpp.org/ftp/tsg%5Fran/WG1%5FRL1/TSGR1%5F93/Docs. [retrieved on May 12, 2018] sections 1'3, 4.

* cited by examiner

EXTENDED SLOT AGGREGATION SCHEDULING IN IAB NETWORK

CROSS-REFERENCE TO RELATED APPLICATION(S)

This application claims benefit of U.S. Provisional Application Ser. No. 62/879,079, entitled "EXTENDED SLOT AGGREGATION SCHEDULING IN IAB NETWORK" and filed Jul. 26, 2019, which is expressly incorporated by reference herein in its entirety.

BACKGROUND

The present disclosure relates to wireless communication systems, and more particularly, to extended slot aggregation scheduling in an integrated access and backhaul (IAB) wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current backhaul solutions may not provide a desired level of speed or customization for efficient operation. Thus, improvements in wireless communication operations may be desired.

SUMMARY

Aspects of the present disclosure provide techniques of allocating time resources (or slots) based on a flexible pattern that allows allocation of a set of non-continuous time slots resources in an integrated access and backhaul (IAB) system. In one example, the aggregation pattern may be indicated via a single downlink control information (DCI) message that carries explicit information regarding non-continuous time slot allocation. Features of the present disclosure may also include techniques to allow for early termination of transmission between the first node and the second node when the receiver (e.g., second node) successfully receives the data channel before the end of aggregated transmission. In such situation, the first node and the second node may cease transmission after reception of an acknowledgement (ACK) message that may allow the second node to utilize the subsequent time slots for communication with its own children on the next hop (e.g., third node).

In one example, a method for wireless communication implemented by an IAB node is disclosed. The method may include allocating, at a first node, a set of resources in non-continuous time slots to a second node for communication with the first node; generating a control message that identifies the set of non-continuous time slots allocated to the second node; and transmitting the control message to the second node to schedule a communication in each of the set of non-continuous time slots.

In another example, an apparatus node for wireless communications. The apparatus node may include a memory having instructions and a processor configured to execute the instructions to allocate, at a first node, a set of resources in non-continuous time slots to a second node for communication with the first node; generate a control message that identifies the set of non-continuous time slots allocated to the second node; and transmit the control message to the second node to schedule a communication in each of the set of non-continuous time slots.

In some aspects, a non-transitory computer readable medium includes instructions stored therein that, when executed by a processor, cause the processor to perform the steps of allocating, at a first node, a set of resources in non-continuous time slots to a second node for communication with the first node; generating a control message that identifies the set of non-continuous time slots allocated to the second node; and transmitting the control message to the second node to schedule a communication in each of the set of non-continuous time slots.

In certain aspects, another apparatus for wireless communication is disclosed. The apparatus may include means for allocating, at a first node, a set of resources in non-continuous time slots to a second node for communication with the first node; means for generating a control message that identifies the set of non-continuous time slots allocated to the second node; and means for transmitting the control message to the second node to schedule a communication in each of the set of non-continuous time slots.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
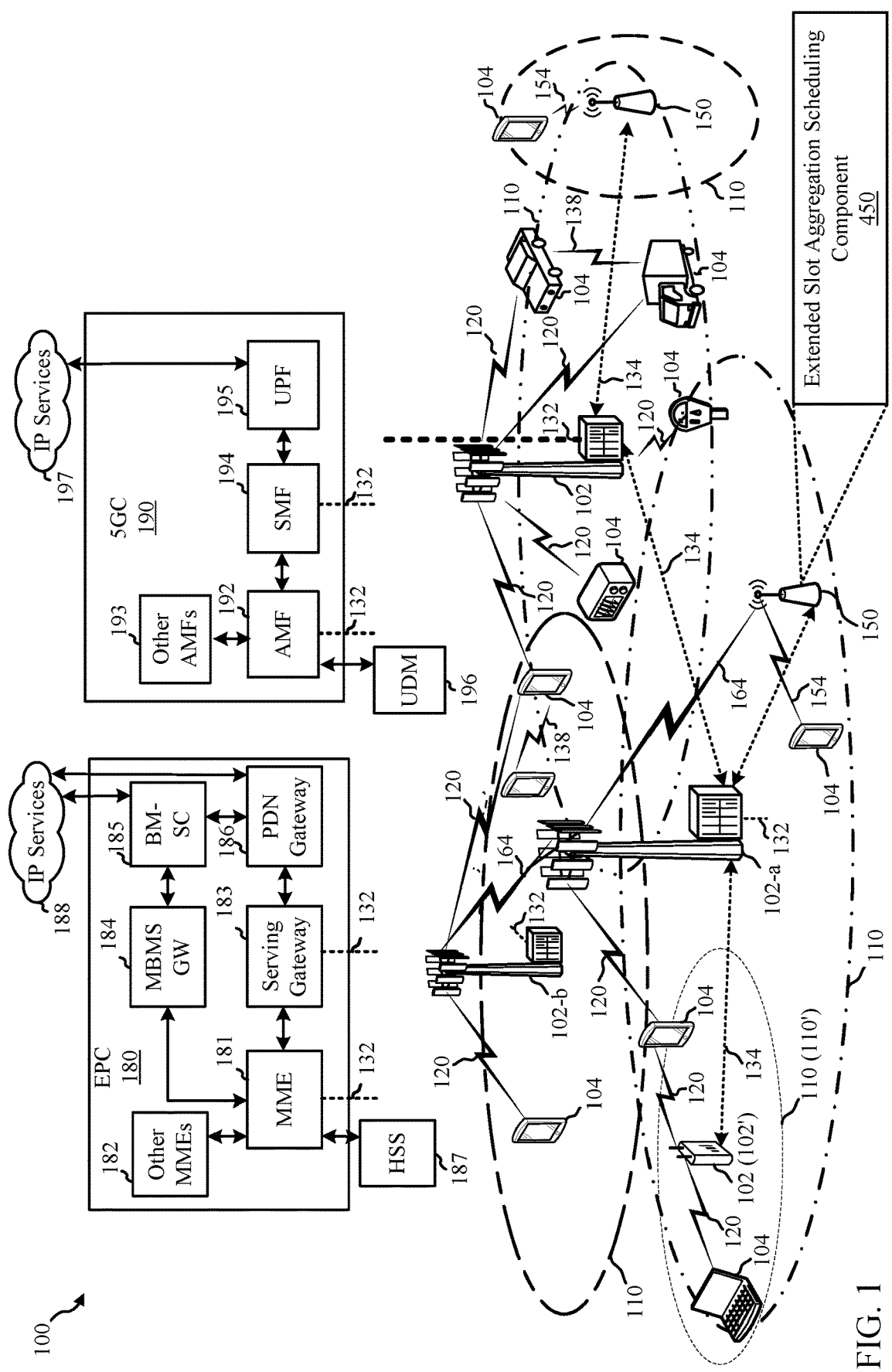
FIG. 1 is a schematic diagram of an example of a wireless communications system in accordance with aspects of the present disclosure.

One aspect of the 5G NR communications technology includes the use of high-frequency spectrum bands, such as those above 24 GHz, which may be referred to as millimeter wave (mmW) bands. The use of these bands enables extremely high data rates and significant increases in data processing capacity. However, compared to LTE, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, may change the channel conditions between the base station (BS) and the user equipment (UE), and thus impact communication performance.

Current mmW 5G NR systems leverage the small wavelengths of mmW at the higher frequencies to make use of multiple input multiple output (MIMO) antenna arrays to create highly directional beams that focus transmitted radio frequency (RF) energy in order to attempt to overcome the propagation and path loss challenges in both the uplink and downlink links. The isotropic path loss and the propagation characteristics of the mmWave environment, however, demands a dense next generation node base station (gNBs) (i.e., base stations in NR technology) deployment to guarantee line-of-sight links at any given time and to decrease the outage probability. In such deployments, equipping each gNB with a wired backhaul link (e.g., fiber) may not be feasible due to the high expense involved. As such, network operators have considered using wireless backhaul as a more cost-effective alternative solution for high-density deployment scenarios. However, utilization of wireless backhaul communication introduces additional implementation challenges, including interference management.

Facilitating wireless backhaul communication may include utilizing IAB nodes (which may include "relay nodes") that may have both a base station (gNB)-type and a user equipment (UE)-type functionality. The IAB nodes provide the wireless communications system flexibility such that only a fraction of gNBs may be equipped with a traditional wired backhaul capabilities (e.g., using cable or optical fiber), while the rest of the gNBs (or IAB nodes) may have direct or indirect (e.g., via relay nodes) wireless connections to the wired backhaul, e.g., possibly through multiple hops via one or more relay nodes. According to the 3GPP agreements, NR cellular networks with IAB functionalities may be characterized by (i) the possibility of using the mmWave spectrum; (ii) the integration of the access and backhaul technologies (e.g., using the same spectral resources and infrastructures to serve both mobile terminals in access as well as the NR gNBs in backhaul); and, (iii) the possibility of deploying plug-and-play IAB nodes capable of self-configuring and self-optimizing themselves.

To this end, the IAB nodes may include the gNB-type functionality that allows for transmission and reception of signals to and from child nodes (e.g., a UE or another IAB node) through an access link. Additionally, the IAB nodes may also include the UE-type functionality that allows for transmission and reception of signals to and from a parent node (e.g., a gNB or another IAB node) through backhaul links. By utilizing an IAB node, a common architecture, common waveforms, and common procedures may be shared for access links and backhaul links, thereby reducing the system complexity. For example, the IAB nodes may share the same wireless resources (e.g., via TDM or FDM) between the access links and backhaul links. In an IAB system, the resources may be partitioned and shared among plurality of IAB-nodes (e.g., to address half-duplex issue). However, it should be appreciated that not all resources may be available for communication between an IAB-node and any children nodes or UEs.

In some aspects, the 5G NR communication system, including the IAB system, may support slot aggregation for uplink (UL) and/or downlink (DL) communications. In some cases of slot aggregation, a single DCI may schedule a PDSCH and/or PUSCH that may span multiple (N) consecutive slots. In such situations, the same set of symbols or resources over the N slots may be used by the IAB nodes and UEs for downlink and/or uplink communication. However, in some cases, there may not be a transmission in a particular slot that has been allocated via slot aggregation. For example, in the IAB system, a slot may not be available for an IAB-parent node to communicate with its IAB-child node. For example, the IAB-parent node may not be able to communicate with a first IAB-child node because the IAB-parent is using the slot to communicate with a second IAB-child node, or because a node higher than the parent (e.g., an IAB-donor node) may have reserved the slot for communications. Further, in this situation, the IAB-child node may not have knowledge or information regarding the availability of resources for communication in the slot at its IAB-parent node. Moreover, it may not be feasible for the IAB-child node to cancel a data communication that was scheduled (with a slot aggregation level >1) over such an unavailable slot. In such circumstances, based on these scheduled resources that span over a plurality of consecutive slots, some resources (e.g., time slots) to be wasted or underutilized when there is no transmission allowed between the IAB-parent nodes and the IAB-child node (or any corresponding first and second nodes), e.g., due to reservation of the slot by the IAB-donor node. One alternative solution to the above-identified problem may include transmitting a new DCI to schedule communications across multiple time slots. However, transmitting multiple DCIs may incur more resource overhead. For example, scanning for multiple DCIs may be resource intensive for the IAB-child node with half-duplex constraints because during the scan time, the IAB-child node may not be able to communicate with its own children nodes.

As such, aspects of the present disclosure provide techniques of allocating time resources (or slots) based on a flexible pattern that allows allocation of a set of non-continuous time slot resources by a first IAB node to a second IAB node for communication. In one example, the aggregation pattern may be indicated via a single DCI that carries explicit information regarding non-continuous time slot allocation. For example, the DCI may include information regarding a set of slot indices or offset values (e.g., an offset of a number of slots relative to the slot in which the DCI was transmitted, or relative to a previous slot used for data transmission). In an alternative implementation, for instance to reduce communication overhead, multiple patterns may be preconfigured semi-statically (e.g., via radio resource control (RRC) configuration), and the DCI may indicate an index to one of the patterns in order to identify the non-continuous time slot allocation. In a further alternative or additional implementation, which may provide additional communication efficiencies, the configured patterns can be either cell-specific (e.g., common to all child links) or UE/child-specific (e.g., different patterns can be specified for different children). In the cell-specific case, the patterns can be indicated in a multicast/broadcast manner, such in as in a system in formation block (SIB). In the child-specific case, the patterns can be indicated in a unicast manner, such as in a dedicated radio resource control (RRC) message.

Additionally or alternatively, aspects of the present disclosure may include techniques to allow for early termination of transmission between the first node and the second node. For example, in some instances, the receiver (e.g., second node) may successfully receive the data channel (e.g., determined based on a cyclic redundancy check (CRC) being successful) before the end of aggregated slot transmission (e.g., the plurality of allocated slot resources). In such situation, the first node and the second node may cease transmission in subsequent ones of the aggregated slots after reception of an acknowledgement (ACK) message. Terminating the transmission between the first node and the second node on any of the subsequent time slots remaining from the set of non-continuous time slot resources may allow the second node to utilize the subsequent time slots, for example, for communication with its own children nodes or other communications with the parent.

Thus, the present solution supports a more flexible pattern for slot aggregation scheduling as compared to existing solutions, which only allow for slot aggregation of a number of consecutive slots. As such, the present solution provides for more efficient communications.

Various aspects are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100 for extended slot aggregation scheduling in an IAB system. In particular, The wireless communications system 100 may include one or more base stations 102, one or more UEs 104, and a core network, such as an Evolved Packet Core (EPC) 180 and/or a 5G core (5GC) 190. The one or more base stations 102 and/or UEs 104 may operate according to millimeter wave (mmW or mmWave) technology. For example, mmW technology includes transmissions in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

As noted above, communications using the mmW and/or near mmW radio frequency band have extremely high path loss and a short range. Thus, the propagation characteristics of the mmWave environment demands deployment of dense gNBs 102 (i.e., base stations 102 in NR technology) to guarantee line-of-sight links at any given time and decrease the probability of outage. However, providing each such gNBs 102 with a wired backhaul link 132 may not be economically feasible. Thus, an alternative wireless backhaul 164 has been considered that utilizes IAB nodes 150 for facilitating 5G communications.

In some examples, the IAB nodes 150 may include both gNB-type functionality and the UE-type functionality. The IAB nodes 150 afford the wireless communications system 100 flexibility such that only a fraction of gNBs (e.g., base stations 102-a, 102-b) may be equipped with a traditional fiber-like wired 132 backhaul capabilities, while the rest of the gNBs (e.g., IAB nodes 150) may act as relays that are connected to the fiber infrastructures wirelessly 164, possibly through multiple hops.

In some examples, the one or more IAB nodes 150 may include an extended slot aggregation scheduling component

450 (see FIG. 4) for allocating time resources (or slots) that adopt a flexible pattern, including allowing the IAB node 150 (e.g., parent IAB node) to schedule PDSCH/PUSCH that spans over non-continuous slots, e.g., that is transmitted in respective scheduled resources in a set of non-continuous slots.

Additionally, in some examples, the child-IAB node or UE may be configured to receive allocation of resources and communicate on the allocated resources with the parent-IAB node. In some aspects, multiple aggregation patterns may be preconfigured semi-statically (e.g., via RRC configuration), and the DCI may indicate an index to one of these patterns. In such instances, the configuration pattern may be either cell-specific (e.g., common to all child links) or UE/child-specific (e.g., different patterns can be specified for different children nodes). In case of cell-specific, the patterns can be indicated in a multicast/broadcast manner (e.g., system information block (SIB)). In case of child-specific, the patterns may be indicated in a unicast manner (e.g., in a dedicated RRC message).

The EPC 180 and/or the 5GC 190 may provide user authentication, access authorization, tracking, internet protocol (IP) connectivity, and other access, routing, or mobility functions. The base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC 180 or the 5GC 190), with one another over backhaul links 132, 134 (e.g., Xn, X1, or X2 interfaces) which may be wired or wireless communication links.

The base stations 102 may wirelessly communicate with the UEs 104 via one or more base station antennas. Each of the base stations 102 may provide communication coverage for a respective geographic coverage area 110. In some examples, base stations 102 may be referred to as a base transceiver station, a radio base station, an access point, an access node, a radio transceiver, a NodeB, eNodeB (eNB), gNB, Home NodeB, a Home eNodeB, gNodeB (gNB), a relay, a transceiver function, a basic service set (BSS), an extended service set (ESS), a transmit reception point (TRP), or some other suitable terminology. The geographic coverage area 110 for a base station 102 may be divided into sectors or cells making up only a portion of the coverage area (not shown). The wireless communication network 100 may include base stations 102 of different types (e.g., macro base stations 102 or small cell base stations 180, described below).

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. The wireless communication network 100 may be a heterogeneous technology network in which different types of base stations provide coverage for various geographical regions. For example, each base station 102 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 104 with service subscriptions with the network provider. A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 104 with service subscriptions with the network provider. A femto cell may also cover a small geographic area (e.g., a home) and may provide restricted access and/or unrestricted access by UEs 104 having an association with the femto cell (e.g., in the restricted access case, UEs 104 in a closed subscriber group (CSG) of the base station 102, which may include UEs 104 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 104 may be dispersed throughout the wireless communication network 100, and each UE 104 may be stationary or mobile. A UE 104 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 104 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 104 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 104 may be able to communicate with various types of base stations 102 and network equipment including macro eNBs, small cell eNBs, macro gNBs, small cell gNBs, gNB, relay base stations, and the like.

UE 104 may be configured to establish one or more wireless communication links 120 with one or more base stations 102. The wireless communication links 120 shown in wireless communication network 100 may carry uplink (UL) transmissions from a UE 104 to a base station 102, or downlink (DL) transmissions, from a base station 102 to a UE 104. Each wireless communication link 120 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 120 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 120 may represent one or more broadcast channels.

In some aspects of the wireless communication network 100, base stations 102 or UEs 104 may include multiple antennas for employing antenna diversity schemes to improve communication quality and reliability between base stations 102 and UEs 104. Additionally or alternatively, base stations 102 or UEs 104 may employ multiple input multiple output (MIMO) techniques that may take advantage of multi-path environments to transmit multiple spatial layers carrying the same or different coded data.

Wireless communication network 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 104 may be configured with multiple downlink CCs and one or more uplink CCs for carrier aggregation. Carrier aggregation may be used with both FDD and TDD component carriers. The communication links 120 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc., MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communication network 100 may further include base stations 102 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

In a non-limiting example, the EPC 180 may include a Mobility Management Entity (MME) 181, other MMEs 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
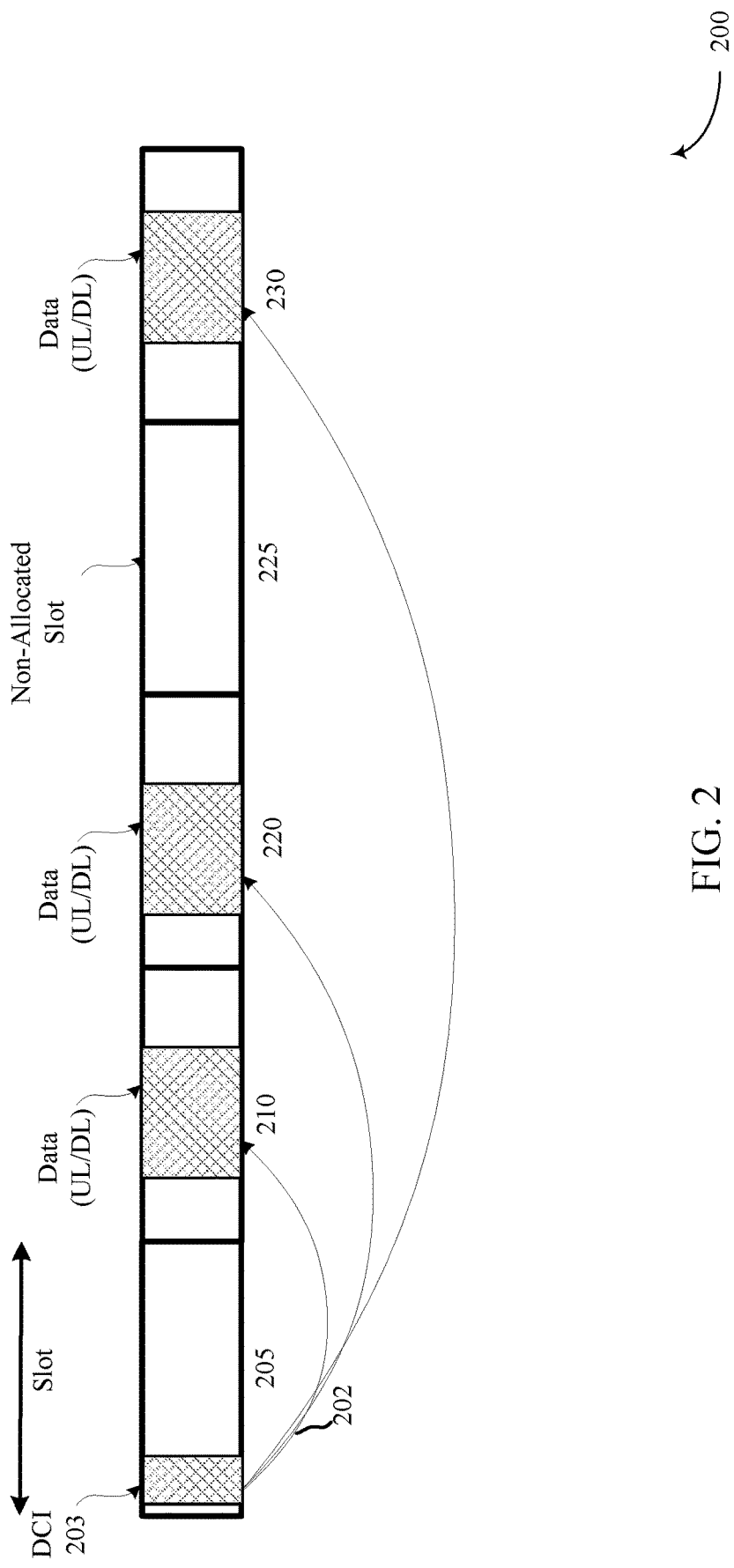
FIG. 2 is a schematic diagram of an example frame structure having resource utilization for scheduled slot aggregation for a communication, including an allocation of a set of non-continuous time slot resources in accordance with aspects of the present disclosure.

Referring to FIG. 2, frame structure 200 includes example resources for wireless communication systems that employ mmW communication, and more particularly an allocation 202 of a set of non-continuous time slots resources (e.g., time slots 210, 220, and 230) in an IAB system in accordance with aspects of the present disclosure. In some examples, a plurality of time slots (e.g., 205, 210, 220, 225, and 230) may be available for an IAB node 150 (e.g., an IAB-parent node) to allocate to one or more IAB-child nodes (or UEs). However, in some cases, there may not be resources available for transmission or reception in a particular slot. For example, in IAB system, an intermediate slot (e.g., time slot 225) may not be available for the parent node to communicate with its child node, for example, when the parent node is utilizing the slot for communication with another child node. Also, the child node may not have knowledge or information regarding the availability of these slot resources at its parent node. Moreover, it may not be feasible for the child node to cancel data communication that was scheduled (with an aggregation level >1) over that unavailable slot. In such circumstances, existing solutions only allow the parent node to allocate resources that span over plurality of consecutive slots, which can result in some resources (e.g., time slots 225) being wasted or underutilized when there is no transmission between the first/parent and second/child node. As noted above, one solution to the above-identified problem may include transmitting multiple DCIS to schedule communications across multiple time slots. However, transmitting multiple DCIS may incur more resource overhead. For example, scanning for multiple DCIS may be resource intensive for an IAB-child node with half-duplex constraints because during the scan time, the IAB-child node may not be able to communicate with its own children nodes.

Aspects of the present disclosure provide techniques of allocating time resources (or slots) based on a flexible pattern that allows a control message 203, e.g., a DCI, to indicate an allocation 202 of a set of non-continuous time slots resources (e.g., time slots 210, 220, and 230) by a first IAB to a second IAB node for communication. In one example, the aggregation pattern may be indicated via a single DCI 203 that carries explicit information regarding non-continuous time slot allocation (e.g., time slots 205, 210, 220, and 230). For example, the DCI 203 may include information regarding a set of slot indices (slot index [2, 3, and 5] or offset values (e.g., offset values for a number of slot over which the DCI was transmitted, or with respect to the previous slot used for data transmission).

Specifically, in one example, the DCI message 203 transmitted in the first time slot 205 may explicitly identify a set of slot indices associated with the set of non-continuous time slots (e.g., slot index 2, 3, and 5 corresponding to time slots 210, 220, and 230) allocated to the second node.

In another example, the DCI message 203 may identify the set of non-continuous time slots allocated to the second node by including a set of offset values that correspond to each of the set of non-continuous slots relative to a time slot used to transmit the DCI message (e.g., first time slot 205). Thus, in such instance, the offset values in FIG. 2 may include offset values {1, 2, and 4} corresponding to the offset of each of time slot 210, 220, and 230 from the first time slot 205 that carries the DCI message 203.

In yet another example, the DCI message 203 may identify the set of non-continuous time slots allocated to the second node by including a set of offset values that correspond to each of the set of non-continuous slots relative to a previous time slot used for a previous data transmission (e.g., offset values {1, 1, 2} corresponding to time slots 210, 220, and 230). For example, the first offset value {1} in offset values {1, 1, 2} from the previous data transmission may indicate that the second node is allocated resources in slot 210 that is one slot removed from the first time slot 205 that carried at least the control message. Similarly, the second offset value {1} in the matrix may indicate that the next allocated slot 220 is also one slot removed from the previous data transmission (e.g., data in slot 210). Finally, in the above example, and in reference to FIG. 2, the third offset value {2} in the matrix may indicate that the next allocated slot is the fourth time slot 230 that is two slots removed from the previous slot (e.g., slot 220) that carried uplink and/or downlink data. As such, by identifying the offset values, the first node may be able to signal to the second node that the third time slot 225 has not been allocated to the second node.

Finally, in another example, the DCI message 203 may identify the set of non-continuous time slots allocated to the second node by including information associated with time slots that are not allocated to the second node (e.g., non-allocated slot index {4} associated with time slot 225).

In some aspects, multiple aggregation patterns may be preconfigured semi-statically (e.g., via RRC configuration), and the DCI 203 may indicate an index to one of these patterns. In such instances, the configuration pattern may be either cell-specific (e.g., common to all child links) or UE/child-specific (E.g., different patterns can be specified for different children nodes). In case of cell-specific, the patterns can be indicated in a multicast/broadcast manner (e.g., system information block (SIB)). In case of child-specific, the patterns may be indicated in a unicast manner (e.g., in a dedicated RRC message).

Figure 3:
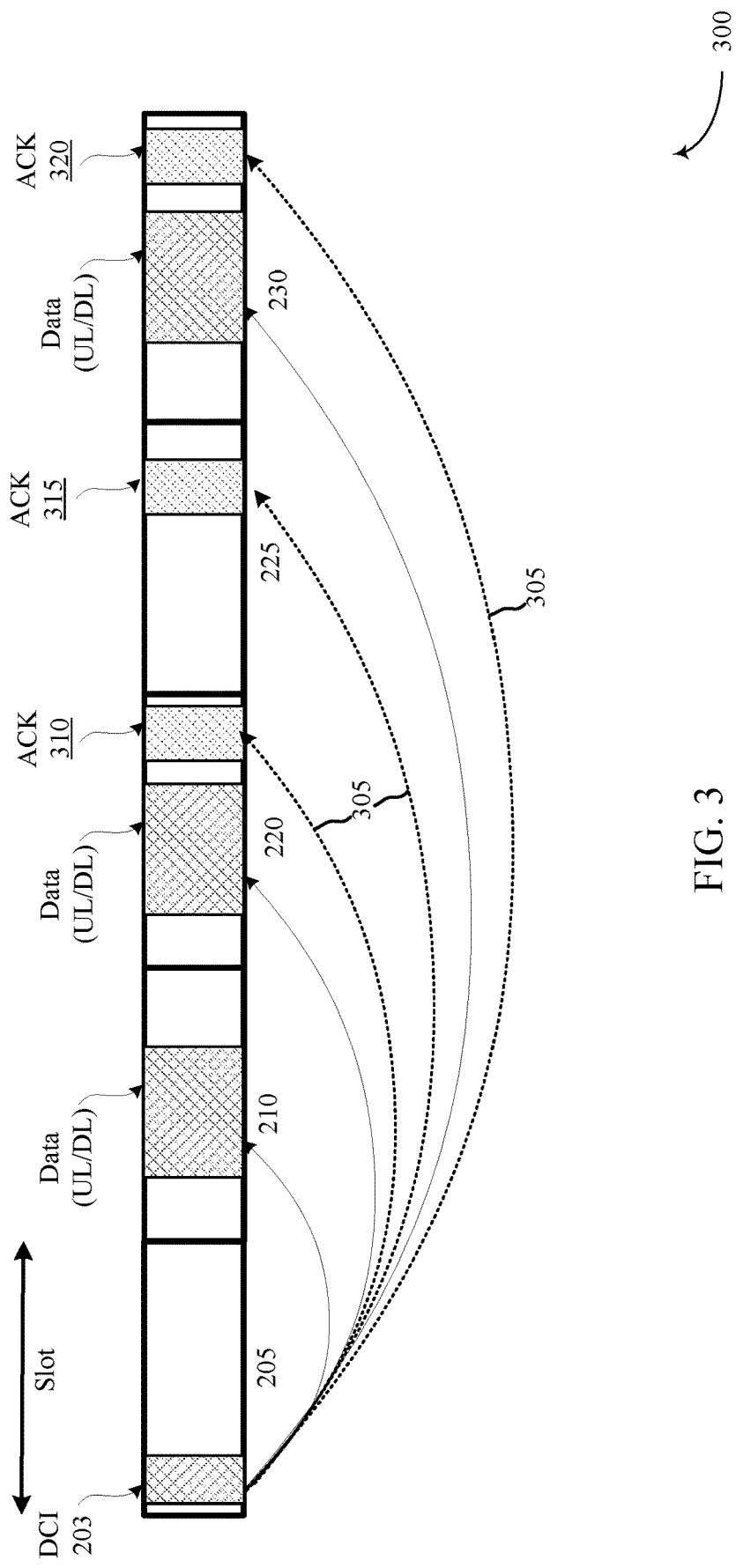
FIG. 3 is a schematic diagram of an example frame structure having resource utilization for scheduled slot aggregation for a communication, similar to FIG. 2, but further including an early termination of the communication in the scheduled aggregated slots based on an acknowledgement message received over one or more acknowledgement resources that are allocated in accordance with aspects of the present disclosure.

Referring to FIG. 3, an example frame structure 300 for early termination of aggregated communication based on acknowledgement messages received over one or more acknowledgement resources (e.g., ACK resources 310, 315, 320) that are allocated 305 in accordance with aspects of the present disclosure. As discussed above, in some instances, the receiver (e.g., second node) may successfully receive the data channel (e.g., CRC is successful) before the end of aggregated transmission (e.g., the plurality of allocated resources). In such situation, the first node and the second node may cease transmission after reception of an ACK message. Terminating the transmission between the first node and the second node on any of the subsequent time slots remaining from the set of non-continuous time slots resources may allow the second node to utilize the subsequent time slots for communication with its own children on the next hop (e.g., third node). In some examples, the first node and the second node may be an IAB nodes.

Thus, if for example, the second node is able to decode one or more data packets transmitted in time slots 210 and 220, the second node may transmit an ACK message in the reserved ACK resource 310 to the first node. The first node may scan the set of ACK resources (ACK resources 310, 315, and 320) for an ACK message that may be transmitted by the second node. If the ACK message is received by the first node in reserved ACK resource 310, the first node may terminate transmission with the second node on the subsequent time slots (e.g., time slot 230) remaining from the set of non-continuous time slots resources that were allocated to the second node for communication with the first node. Accordingly, terminating the transmission between the first node and the second node on the subsequent time slots remaining from the set of non-continuous time slots resources may allow the second node to utilize the subsequent time slots (e.g., time slot 230) for communication with a third node (e.g., the children of the second node that may be another IAB node and/or UE).

Figure 4:
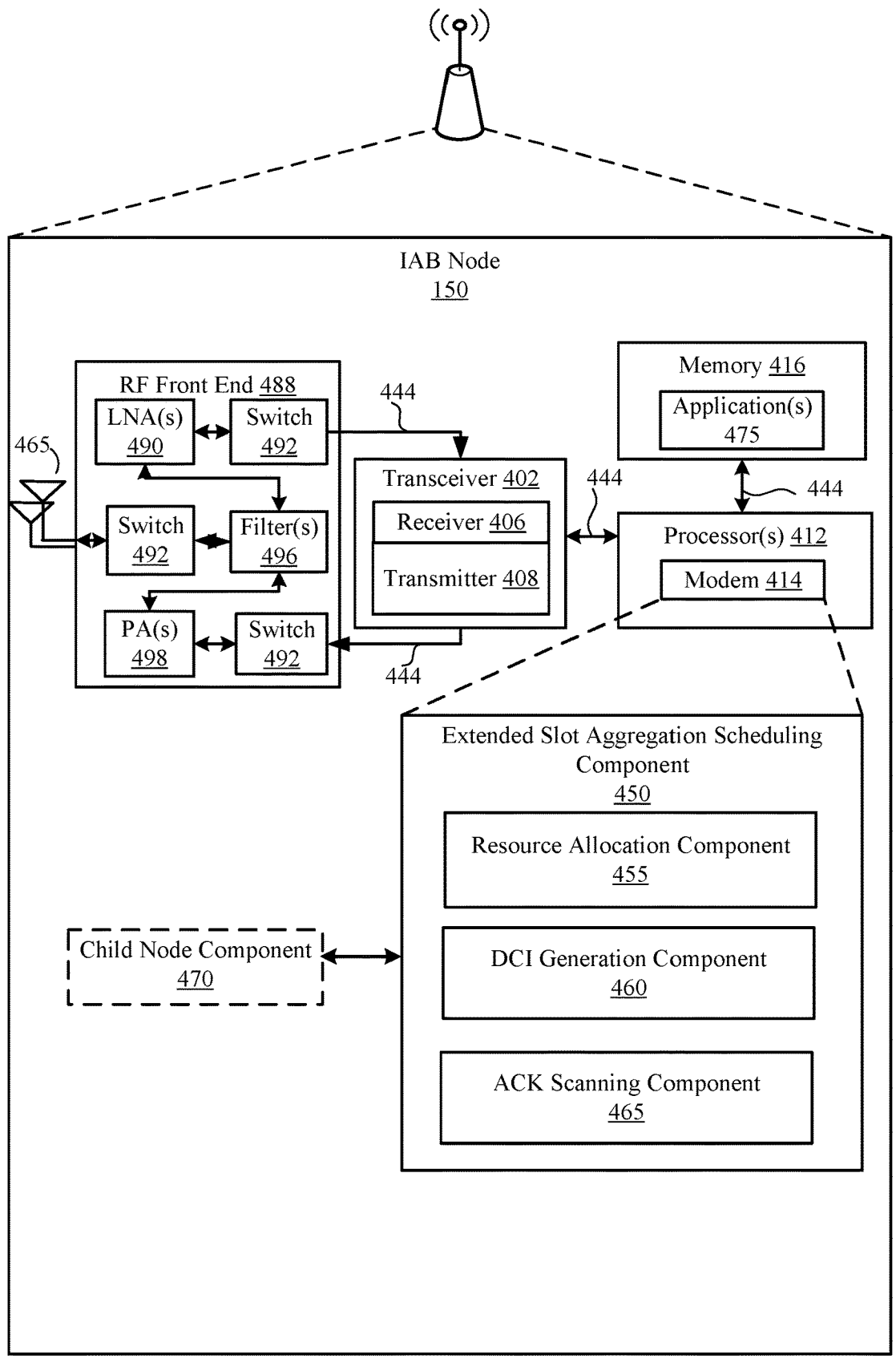
FIG. 4 is a schematic diagram of an example implementation of various components of an IAB node in accordance with various aspects of the present disclosure.

Referring to FIG. 4, an example of a device, which may be IAB node 150, includes hardware components and subcomponents for implementing one or more methods (e.g., methods 500 and 600) described herein in accordance with various aspects of the present disclosure. For example, one example of an implementation of the IAB node 150 may include a variety of components, some of which have already been described above, but including components such as one or more processors 412, memory 416 and transceiver 402 in communication via one or more buses 444, which may operate in conjunction with the extended slot aggregation scheduling component 450 to perform functions described herein related to including one or more methods (e.g., 500 and 600) of the present disclosure.

In some examples, the extended slot aggregation scheduling component 450 may include a resource allocation component 455 for allocating a set of non-continuous time slots resources to at least one IAB node 150 or UE (e.g., child node or UE) for communication with the IAB-parent node. In addition, the resource allocation component 455 may additionally allocate a set of ACK resources to the second node (e.g., IAB-child node or UE) in order to allow the second node to transmit an ACK to the first node when the second node successfully decodes the data channel prior to an end of aggregated transmissions from the first node. To this end, the resource allocation component 455 may also include an ACK scanning component 465 for scanning the set of ACK resources for the ACK for the second node. In some examples, the extended slot aggregation scheduling component 450 may terminate transmission or communication with the second node on any subsequent time slots remaining from the set of non-continuous time slots resources that were allocated to the second node for communication with the first node. Terminating the transmission between the first node and the second node on any of the subsequent time slots remaining from the set of non-continuous time slots resources may allow the second node to utilize the subsequent time slots for communication with a third node (e.g., another IAB-child node, UE). The extended slot aggregation scheduling component 450 may further include a DCI generation component 460 for generating a DCI message that identifies the set of non-continuous time slots allocated to the second node. In some examples, the set of ACK resources discussed above may also be indicated in one of the DCI or RRC configured. The DCI generation component 460 in connection with the transceiver 402 may transmit the DCI message to second node to schedule one of a PDSCH or PUSCH that span across the set of non-continuous time slots. Similarly, the allocation and scheduling of ACK resources may also be transmitted to the second node via the transceiver 402.

In some examples, the IAB node 150 may also include a child node component 470 that allows the IAB node 150 to function as a child node that receives the allocation of set of non-continuous time slots and communicates with a parent IAB node. As discussed above, IAB nodes 150 may include both a base station (gNB)-type and a UE-type functionality. The IAB nodes provide the wireless communications system flexibility such that only a fraction of gNBs may be equipped with a traditional wired backhaul capabilities (e.g., using cable or optical fiber), while the rest of the gNBs (or IAB nodes) may have direct or indirect (e.g., via relay nodes) wireless connections to the wired backhaul, e.g., possibly through multiple hops via one or more relay nodes. To this end, the IAB nodes may include the gNB-type functionality that allows for transmission and reception of signals to and from child nodes (e.g., a UE or another IAB node) through an access link. Additionally, the IAB nodes may also include the UE-type functionality that allows for transmission and reception of signals to and from a parent node (e.g., a gNB or another IAB node) through backhaul links. Thus, it should be appreciated that the IAB node 150 illustrated in FIG. 4 may function as both a parent IAB node and/or the child IAB node. Further, in some cases, the IAB 150 may also be an example of UE 104 that communicates with one or more base stations or other IAB nodes.

As such, in some cases, the IAB 150, when acting as a first node, may transmit PDSCH to the second node over multi-slot transmissions. Similarly, the IAB 150, when acting as a second node, may receive the PDSCH and allocation of aggregated time slot resources to communicate (PDSCH or PUSCH) with the first node.

Thus, in some cases, the IAB node 150 may transmit multi-slot PDSCH to the second node when acting as a parent-IAB node 150. Additionally or alternatively, the IAB node 150 while executing the child node component 470 may transmit communication to the first node on one of the set of non-continuous time slot resources scheduled for a multi-slot PUSCH from the second node.

The IAB node 150 may also allocate a set of ACK resources to allow the first node to transmit an ACK message to the second node. In such situations, the second node, via the child node component 470, may execute the ACK scanning component 465 of the IAB node 150 to scan and monitor the set of ACK resources for the ACK message from the first node corresponding to the communication. If the first node is successful decoding the data channel prior to the end of aggregated PUSCH transmission from the second node, the first node may transmit an ACK message in one of the set of ACK resources. Accordingly, the communication between the first node and the second node on any subsequent time slots remaining from the set of non-continuous time slot resources may be terminated by the second node upon receiving the ACK message. As such, the second node may utilize the subsequent time slots for communication with a third node based on detecting the ACK message from the first node.

The one or more processors 412, modem 414, memory 416, transceiver 402, RF front end 488 and one or more antennas 465, may be configured to support voice and/or data calls (simultaneously or non-simultaneously) in one or more radio access technologies. In an aspect, the one or more processors 412 may include a modem 414 that uses one or more modem processors. The various functions related to uplink preemption indication component 450 may be included in modem 414 and/or processors 412 and, in an aspect, may be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with timing management component 850 may be performed by transceiver 402. The one or more antennas 465 may include stand-alone antennas and/or antenna arrays.

The memory 416 may be configured to store data used herein and/or local versions of application(s) 475 or uplink preemption indication component 450 and/or one or more of its subcomponents being executed by at least one processor 412. The memory 416 may include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining uplink preemption indication component 450 and/or one or more of its subcomponents, and/or data associated therewith, when the IAB node 150 is operating at least one processor 412 to execute timing management component 850 and/or one or more of its subcomponents.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 406 may receive signals transmitted by at least one UE 104. Additionally, receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 408 may including, but is not limited to, an RF transmitter.

Moreover, in an aspect, transmitting device may include the RF front end 488, which may operate in communication with one or more antennas 865 and transceiver 802 for receiving and transmitting radio transmissions, for example, wireless communications transmitted by at least one base station 102, other IAB nodes 150 or wireless transmissions transmitted to and by UE 104. The RF front end 888 may be connected to one or more antennas 465 and may include one or more low-noise amplifiers (LNAs) 490, one or more switches 492, one or more power amplifiers (PAs) 498, and one or more filters 496 for transmitting and receiving RF signals.

In an aspect, the LNA 490 may amplify a received signal at a desired output level. In an aspect, each LNA 490 may have a specified minimum and maximum gain values. In an aspect, the RF front end 488 may use one or more switches 492 to select a particular LNA 490 and its specified gain value based on a desired gain value for a particular application.

Further, for example, one or more PA(s) 498 may be used by the RF front end 488 to amplify a signal for an RF output at a desired output power level. In an aspect, each PA 498 may have specified minimum and maximum gain values. In an aspect, the RF front end 488 may use one or more switches 492 to select a particular PA 498 and its specified gain value based on a desired gain value for a particular application.

Also, for example, one or more filters 496 may be used by the RF front end 488 to filter a received signal to obtain an input RF signal. Similarly, in an aspect, for example, a respective filter 496 may be used to filter an output from a respective PA 498 to produce an output signal for transmission. In an aspect, each filter 496 may be connected to a specific LNA 490 and/or PA 498. In an aspect, the RF front end 488 may use one or more switches 492 to select a transmit or receive path using a specified filter 496, LNA 490, and/or PA 498, based on a configuration as specified by the transceiver 402 and/or processor 412.

As such, the transceiver 402 may be configured to transmit and receive wireless signals through one or more antennas 465 via the RF front end 488. In an aspect, the transceiver 402 may be tuned to operate at specified frequencies such that transmitting device may communicate with, for example, one or more base stations 102 or one or more cells associated with one or more base stations 102. In an aspect, for example, the modem 414 may configure the transceiver 402 to operate at a specified frequency and power level based on the configuration of the transmitting device and the communication protocol used by the modem 414.

In an aspect, the modem 414 may be a multiband-multimode modem, which may process digital data and communicate with the transceiver 402 such that the digital data is sent and received using the transceiver 402. In an aspect, the modem 414 may be multiband and be configured to support multiple frequency bands for a specific communications protocol. In an aspect, the modem 414 may be multimode and be configured to support multiple operating networks and communications protocols. In an aspect, the modem 414 may control one or more components of transmitting device (e.g., RF front end 488, transceiver 402) to enable transmission and/or reception of signals from the network based on a specified modem configuration. In an aspect, the modem configuration may be based on the mode of the modem 414 and the frequency band in use. In another aspect, the modem configuration may be based on UE configuration information associated with transmitting device as provided by the network during cell selection and/or cell reselection.

Figure 5:
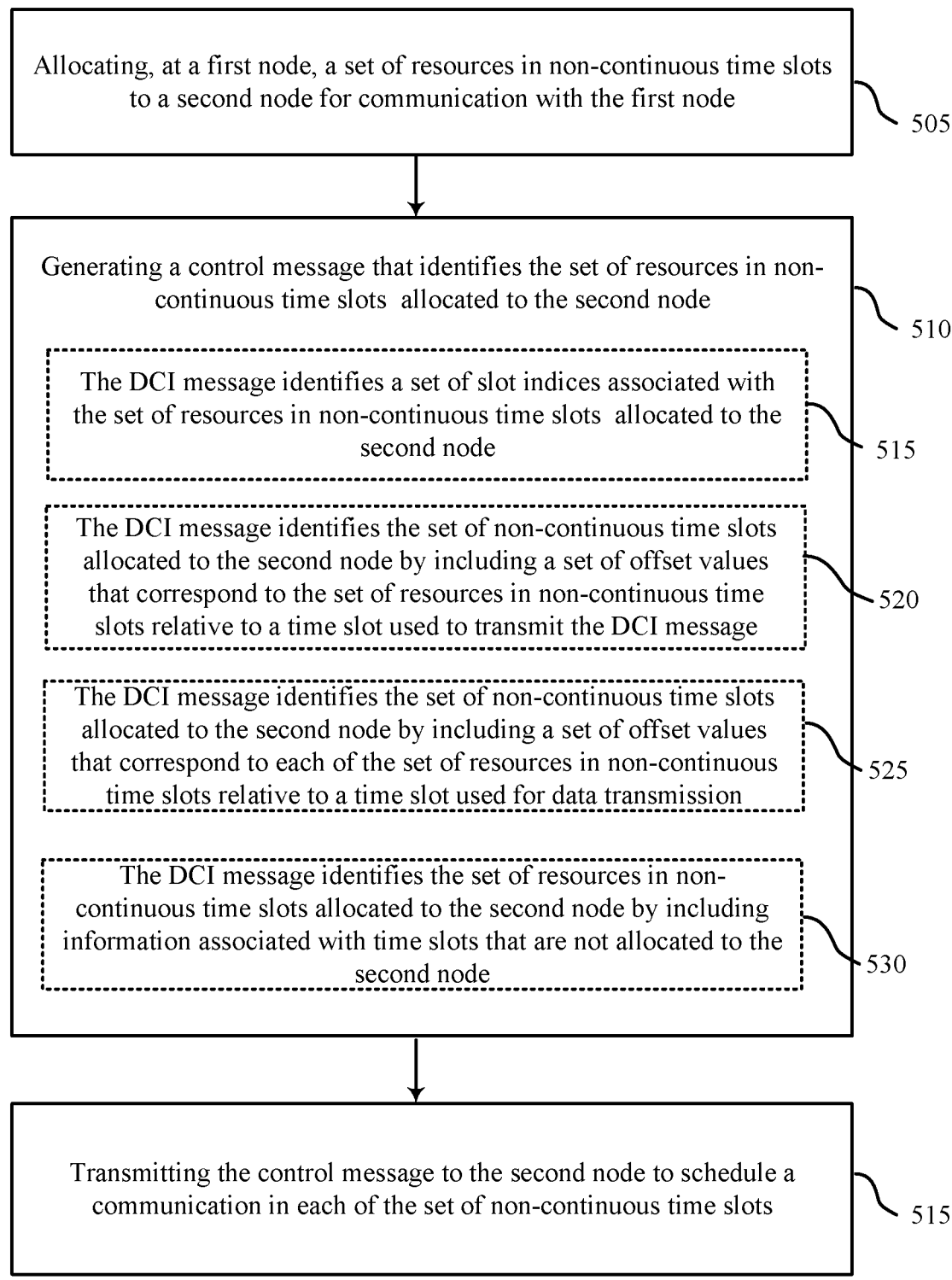
FIG. 5 is a flow diagram of an example of a method of wireless communication implemented by the IAB node in accordance with aspects of the present disclosure.

Referring to FIG. 5, an example method 500 for wireless communications in accordance with aspects of the present disclosure may be performed using the IAB node 150 (e.g., IAB-parent node or an IAB-child node) discussed with reference to FIGS. 1 and 4. Although the method 500 is described below with respect to the elements of the IAB node, other components may be used to implement one or more of the steps described herein. The IAB node may include both a base station type functionality that allows for transmission and reception to and from the child node and a UE-type functionality that allows for transmission and reception to and from a parent node.

At block 505, the method 500 may include allocating, at a first node, a set of resources in non-continuous time slots to a second node for communication with the first node. In some examples, the first node and the second node may be examples of IAB-nodes. In other examples, the first node may be a parent-IAB node and the second node may be a child-IAB node. As noted above, the child-IAB node may be another base station or a UE. Aspects of block 505 may be performed by the extended slot aggregation scheduling component 450, and more particularly the resource allocation component 455 as described with reference to FIG. 4.

For example, the resource allocation component 455 may identify a set of non-continuous time slots from a plurality of available resources that can be allocated for communication between the first node and the second node. In some examples, the set of non-continuous time slots may be used for either uplink or downlink communication between the first node and the second node. Based on the identification of the set of non-continuous time slot resources, the extended slot aggregation scheduling component 450, the resource allocation component 455, modem 414, and/or processor 412 may allocate, at a first node, a set of non-continuous time slots resources to a second node for communication with the first node. Thus, the extended slot aggregation scheduling component 450, the resource allocation component 455, modem 414, processor 412, and/or the IAB node 150 or one of its subcomponents may define the means for allocating, at a first node, a set of resources in non-continuous time slots to a second node for communication with the first node.

At block 510, the method 500 may include generating a control message that identifies the set of non-continuous time slots allocated to the second node. In some examples, the control message may be a DCI message or another control message to identify resource allocation. In one example of sub-block 515, the DCI message may identify a set of slot indices associated with the set of non-continuous time slots allocated to the second node. Additionally or alternative, in another example of sub-block 520, the DCI message identifies the set of non-continuous time slots allocated to the second node by including a set of offset values that correspond to each of the set of non-continuous slots relative to a time slot used to transmit the DCI message. In additional example of sub-block 525, the DCI message may also identify the set of non-continuous time slots allocated to the second node by including a set of offset values that correspond to each of the set of non-continuous slots relative to a previous time slot used for previous data transmission. In another example of sub-block 530, the DCI message may identify the set of non-continuous time slots allocated to the second node by including information associated with time slots that are not allocated to the second node.

Additionally or alternatively, in some examples, generating the control message that identifies the set of non-continuous time slots allocated to the second node, may comprise selecting an aggregation pattern from a plurality of aggregation patterns that may be preconfigured. In some examples, the control message (e.g., DCI message) may identify the index of the aggregation pattern that is selected. In some aspects, the plurality of aggregation patterns are either cell-specific patterns or a node-specific patterns. Further, the plurality of aggregation patterns may be indicated to the second node using a multicast or broadcast message when the plurality of aggregation patterns are cell-specific patterns. Alternatively, the plurality of aggregation patterns may be indicated to the second node using a unicast message when the plurality of aggregation patterns are node-specific patterns.

Aspects of block 510 and sub-blocks 515, 520, 525, and 530 may be performed by the extended slot aggregation scheduling component 450, and more particularly the DCI generation component 460 as described with reference to FIG. 4. For example, the modem 450 of the IAB node 150 may receive information associated with the resource allocation and use the received information to generate a DCI message by encoding the information to a format suitable for transmission over wireless communication. In turn, the transceiver 402 or the transmitter 408 may convert the data into electrical signals that are transmitted over the wireless network to, for example, an IAB-child node. Thus, the modem 450, extended slot aggregation scheduling component 450, DCI generation component 460, the one or more processors 412, and/or the IAB node 150 or one of its subcomponents may define the means for generating a control message that identifies the set of non-continuous time slots allocated to the second node.

At block 515, the method 500 may transmitting the control message to the second node to schedule a communication in each of the set of non-continuous time slots. Aspects of block 515 may be performed by transceiver 402 in connection with the DCI generation component 460 described with reference to FIG. 4. For example, the modem 450 of the IAB node 150 may generate and send the DCI to the transceiver 402 or the transmitter 408 of the IAB node 150. The transceiver 402 or the transmitter 408 may convert the data into electrical signals. The RF front end 488 may filter and/or amplify the electrical signals into the electro-magnetic signals. The one or more antennas 465 of the IAB node 150 may transmit the electro-magnetic signals associated with the DCI to the IAB-child node or UE. Thus, the modem 450, the transceiver 402, the transmitter 408, the RF front end 488, the one or more antennas 465, the one or more processors 412, and/or the IAB node 150 or one of its subcomponents may define the means for transmitting the control message to the second node to schedule a communication in each of the set of non-continuous time slots.

Figure 6:
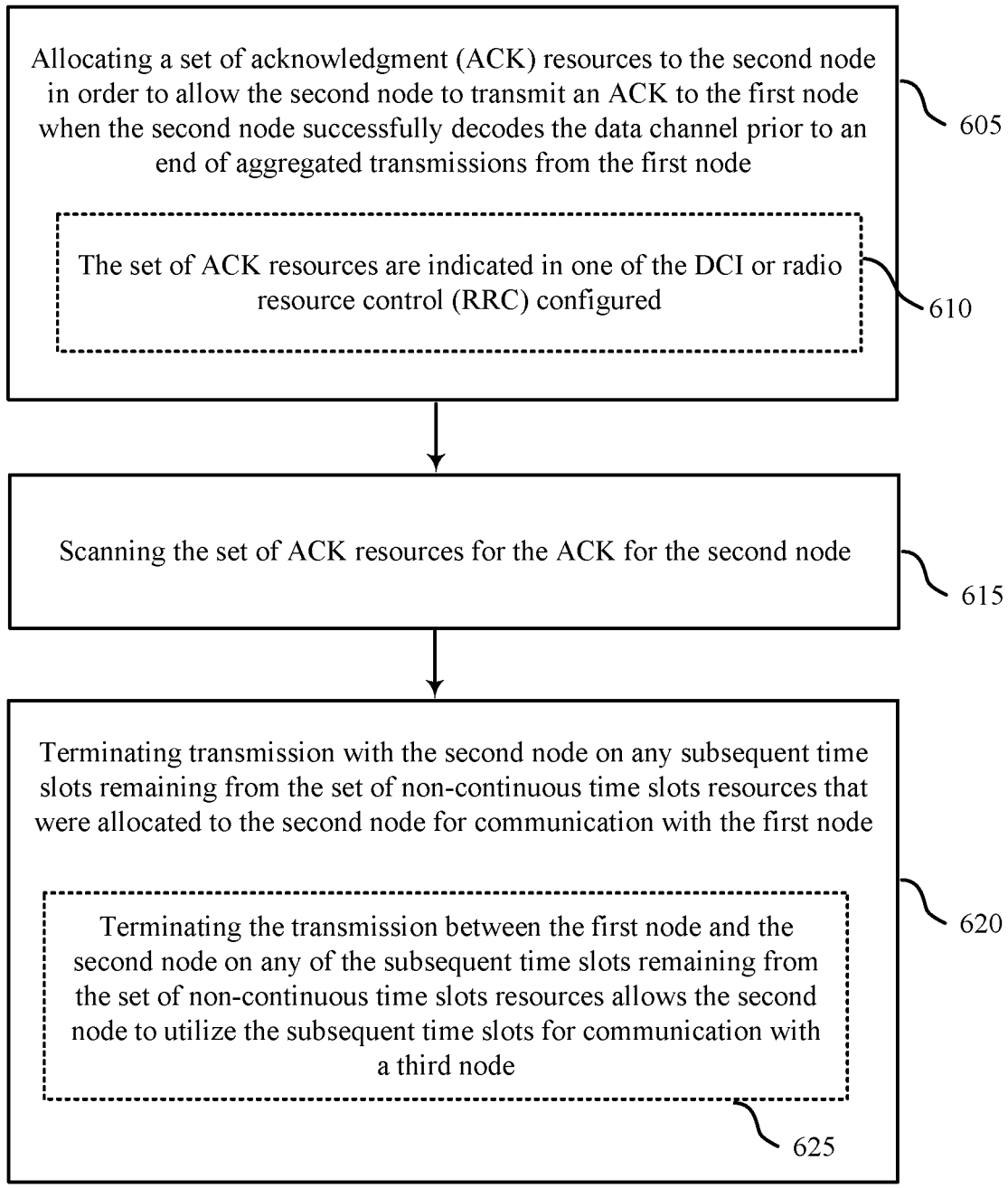
FIG. 6 is another flow diagram of an example of a method of wireless communication implemented by the IAB node in accordance with aspects of the present disclosure.

FIG. 6 is another flowchart of an example method 600 for wireless communications in accordance with aspects of the present disclosure. In some examples, the method 600 may be an extension of the method 500 discussed above, or alternatively may be performed independently. The method 600 may be performed using the IAB node 150 (e.g., IAB-parent node or an IAB-child node) discussed with reference to FIG. 1. Although the method 600 is described below with respect to the elements of the IAB node, other components may be used to implement one or more of the steps described herein. The IAB node may include both a base station type functionality that allows for transmission and reception to and from the child node and a UE-type functionality that allows for transmission and reception to and from a parent node.

At block 605, the method 600 may include allocating a set of ACK resources to the second node in order to allow the second node to transmit an ACK to the first node when the second node successfully decodes the data channel prior to an end of aggregated transmissions from the first node. It should be appreciated that allocating the set of ACK resource may further include generating an ACK resource allocation message and transmitting the ACK resource allocation to the second node. In some examples, as noted in sub-block 610, the set of ACK resources are indicated in one of the DCI or RRC configured. Aspects of block 605 may be performed by the extended slot aggregation scheduling component 450, and more particularly the resource allocation component 455 as described with reference to FIG. 4. For example, the resource allocation component 455 may identify set of ACK resources from a plurality of available resources that can be allocated for communication between the first node and the second node. In some examples, the allocation of the set of ACK may not be limited or correspond to only the set of non-continuous time slots that may be allocated for data communication between the first node and the second node. Thus, in some aspects, the set of ACK resources allocated to the second node for transmitting an ACK message may be less than or more than the set of non-continuous time slots allocated for communicating data (outside of ACK messages). As such, the extended slot aggregation scheduling component 450, the resource allocation component 455, modem 414, and/or processor 412 may allocate a set of ACK resources to the second node in order to allow the second node to transmit an ACK to the first node when the second node successfully decodes the data channel prior to an end of aggregated transmissions from the first node. Thus, the extended slot aggregation scheduling component 450, the resource allocation component 455, modem 414, processor 412, and/or the JAB node 150 or one of its subcomponents may define means for allocating a set of ACK resources to the second node in order to allow the second node to transmit an ACK to the first node when the second node successfully decodes the data channel prior to an end of aggregated transmissions from the first node.

At block 615, the method 600 may include decoding, in one of the set of ACK resources, the ACK message from the second node corresponding to the communication. In some examples, the decoding may be in response to the first node transmitting the communication (e.g., downlink traffic) to the second node on one of the set of non-continuous time slot resources. Aspects of block 615 may be performed by the extended slot aggregation scheduling component 450, and more particularly the ACK scanning component 465 described with reference to FIG. 4. For example, the ACK scanning component 465, the modem 414, and the transceiver 402 may listen to signals received at antenna 465 during the time slot(s) and resources (e.g., frequency and/or time) that the first node previously allocated to the second node for any ACK message transmissions. If the modem 414 and ACK scanning component 465 receives and decodes the received message during the time slot(s) and resources reserved for ACK messages, the ACK scanning component 465 may identify the IAB-child node (or UE) from which the ACK message is received in order to terminate subsequent communication (see block 620) with the second node. In some examples, the ACK message may indicate that the second node has successfully received the data channel (e.g., CRC passes) prior to an end of aggregated transmissions from the first node. Thus, the extended slot aggregation scheduling component 450, the ACK scanning component 465, modem 414, processor 412, and/or the JAB node 150 or one of its subcomponents may define means for scanning the set of ACK resources for the ACK message transmitted by the second node to the first node.

At block 620, the method 600 may include terminating transmission of the communication with the second node on any subsequent time slots remaining from the set of non-continuous time slots resources that were allocated to the second node for communication with the first node. In some examples, terminating the transmission between the first node and the second node on any of the subsequent time slots remaining from the set of non-continuous time slots resources allows the second node to utilize the subsequent time slots for communication with a third node. Aspects of block 620 may be performed by the extended slot aggregation scheduling component 450 receiving an indication from the ACK scanning component 465 that an ACK message was received from the second node. As such, the modem 414, processor(s) 412, and the transceiver 402 may terminate or cease to transmit subsequent downlink transmissions on any subsequent time slots remaining from the set of non-continuous time slots resources that were allocated to the second node for communication with the first node. Thus, the extended slot aggregation scheduling component 450, modem 414, processor 412, transceiver 402, and/or the IAB node 150 or one of its subcomponents may define means for terminating transmission of the communication with the second node on any subsequent time slots remaining from the set of non-continuous time slots resources that were allocated to the second node for communication with the first node.

While the flowchart 600 illustrates the situation of the second node receiving a multi-slot PDSCH from the first node, it should be appreciated that the same techniques may be applied for the multi-slot PUSCH from the second node to the first node. Specifically, in some examples, the first node may receive the communication from the second node on one of the set of non-continuous time slot resources scheduled for a multi-slot PUSCH from the second node. The first node may also allocate a set of ACK resources to allow the first node to transmit an ACK message to the second node. In such situations, the second node may scan and monitor the set of ACK resources for the ACK message from the first node corresponding to the communication. If the first node is successful decoding the data channel prior to the end of aggregated PUSCH transmission from the second node, the first node may transmit an ACK message in one of the set of ACK resources. Accordingly, the communication between the first node and the second node on any subsequent time slots remaining from the set of non-continuous time slot resources may be terminated by the second node upon receiving the ACK message. As such, the second node may utilize the subsequent time slots for communication with a third node based on detecting the ACK message from the first node.

It should also be appreciated that aspects of the present disclosure, particularly with respect to methods 500 and 600 may also perform the mirrored steps of the child node when IAB node 150 implements the child node component 470. For example, the IAB node 150, via the child node component 470, may receive allocation of a set of resources in non-continuous time slots from the first node at the second node for communication with the first node. The child node component 470 may also receive a control message (e.g., DCI message) that identifies the set of non-continuous time slots allocated to the second node. In some examples, the IAB node 150, functioning as a child node, may receive PDSCH from the parent-IAB node or transmit PUSCH to the parent-IAB node in one or more set of resources in non-continuous time slots. It should also be appreciated that the IAB node 150 may also receive ACK messages (e.g., for multi-slot PDSCH communication) or transmit the ACK messages when acting as a child node (e.g., for multi-slot PUSCH communication).

Some Further Example Embodiments

An example method for wireless communications comprising: allocating, at a first node, a set of resources in non-continuous time slots to a second node for communication with the first node; generating a control message that identifies the set of non-continuous time slots allocated to the second node; and transmitting the control message to the second node to schedule a communication in each of the set of non-continuous time slots.

The above example method, wherein the control message identifies a set of slot indices associated with the set of non-continuous time slots allocated to the second node.

Any of the above example methods, wherein the control message identifies the set of non-continuous time slots allocated to the second node by including a set of offset values that correspond to each of the set of non-continuous slots relative to a time slot used to transmit the control message.

Any of the above example methods, wherein the control message identifies the set of non-continuous time slots allocated to the second node by including a set of offset values that correspond to each of the set of non-continuous slots relative to a time slot used for data transmission.

Any of the above example methods, wherein the control message identifies the set of non-continuous time slots allocated to the second node by including information associated with time slots that are not allocated to the second node.

Any of the above example methods, further comprising: allocating a set of acknowledgment (ACK) resources to the second node in order to allow the second node to transmit an ACK message to the first node when the second node successfully decodes the data channel prior to an end of aggregated transmissions from the first node.

Any of the above example methods, wherein the set of ACK resources are indicated in one of the DCI or radio resource control (RRC) configured.

Any of the above example methods, further comprising: scanning the set of ACK resources for the ACK message transmitted by the second node to the first node; and terminating transmission with the second node on any subsequent time slots remaining from the set of non-continuous time slots resources that were allocated to the second node for communication with the first node.

Any of the above example methods, wherein terminating the transmission between the first node and the second node on any of the subsequent time slots remaining from the set of non-continuous time slots resources allows the second node to utilize the subsequent time slots for communication with a third node.

Any of the above example methods, wherein the first node may be an IAB-parent node and the second node may be a IAB-child node, wherein the IAB-child node may be one of a base station, a relay unit (e.g., another IAB-child node), or UE.

Any of the above example methods, wherein the control message is a DCI message.

An example apparatus for wireless communications, comprising: a memory configured to store instructions; a processor communicatively coupled with the memory, the processor configured to execute the instructions to: allocate, at a first node, a set of resources in non-continuous time slots to a second node for communication with the first node; generate a control message that identifies the set of non-continuous time slots allocated to the second node; and transmit the control message to the second node to schedule a communication in each of the set of non-continuous time slots.

The above example apparatus, wherein the control message identifies a set of slot indices associated with the set of non-continuous time slots allocated to the second node.

Any of the above example apparatus, wherein the control message identifies the set of non-continuous time slots allocated to the second node by including a set of offset values that correspond to each of the set of non-continuous slots relative to a time slot used to transmit the control message.

Any of the above example apparatus, wherein the control message identifies the set of non-continuous time slots allocated to the second node by including a set of offset values that correspond to each of the set of non-continuous slots relative to a time slot used for data transmission.

Any of the above example apparatus, wherein the control message identifies the set of non-continuous time slots allocated to the second node by including information associated with time slots that are not allocated to the second node.

Any of the above example apparatus, wherein the processor is further configured to: allocate a set of acknowledgment (ACK) resources to the second node in order to allow the second node to transmit an ACK message to the first node when the second node successfully decodes the data channel prior to an end of aggregated transmissions from the first node.

Any of the above example apparatus, wherein the set of ACK resources are indicated in one of the DCI or radio resource control (RRC) configured.

Any of the above example apparatus, wherein the processor is further configured to: scan the set of ACK resources for the ACK message transmitted by the second node to the first node; and terminate transmission with the second node on any subsequent time slots remaining from the set of non-continuous time slots resources that were allocated to the second node for communication with the first node.

Any of the above example apparatus, wherein terminating the transmission between the first node and the second node on any of the subsequent time slots remaining from the set of non-continuous time slots resources allows the second node to utilize the subsequent time slots for communication with a third node.

Any of the above example methods, wherein the first node may be an IAB-parent node and the second node may be a IAB-child node, wherein the IAB-child node may be one of a base station, a relay unit (e.g., another IAB-child node), or UE.

Any of the above example methods, wherein the control message is a DCI message.

An example, non-transitory computer readable medium storing instructions, executable by a processor, for wireless communications, comprising instructions for: allocating, at a first node, a set of resources in non-continuous time slots to a second node for communication with the first node; generating a control message that identifies the set of non-continuous time slots allocated to the second node; and transmitting the control message to the second node to schedule a communication in each of the set of non-continuous time slots.

The above example computer readable medium, wherein the control message identifies a set of slot indices associated with the set of non-continuous time slots allocated to the second node.

Any of the above example computer readable medium, wherein the control message identifies the set of non-continuous time slots allocated to the second node by including a set of offset values that correspond to each of the set of non-continuous slots relative to a time slot used to transmit the control message.

Any of the above example computer readable medium, wherein the control message identifies the set of non-continuous time slots allocated to the second node by including a set of offset values that correspond to each of the set of non-continuous slots relative to a time slot used for data transmission.

Any of the above example computer readable medium, wherein the control message identifies the set of non-continuous time slots allocated to the second node by including information associated with time slots that are not allocated to the second node.

Any of the above example computer readable medium, further comprising instructions for: allocating a set of acknowledgment (ACK) resources to the second node in order to allow the second node to transmit an ACK message to the first node when the second node successfully decodes the data channel prior to an end of aggregated transmissions from the first node.

Any of the above example computer readable medium, wherein the set of ACK resources are indicated in one of the DCI or radio resource control (RRC) configured.

Any of the above example computer readable medium, further comprising instructions for: scanning the set of ACK resources for the ACK message transmitted by the second node to the first node; and terminating transmission with the second node on any subsequent time slots remaining from the set of non-continuous time slots resources that were allocated to the second node for communication with the first node.

Any of the above example computer readable medium, wherein terminating the transmission between the first node and the second node on any of the subsequent time slots remaining from the set of non-continuous time slots resources allows the second node to utilize the subsequent time slots for communication with a third node.

Any of the above example computer readable medium, wherein the first node may be an IAB-parent node and the second node may be a IAB-child node, wherein the IAB-child node may be one of a base station, a relay unit (e.g., another IAB-child node), or UE.

Any of the above example computer readable medium, wherein the control message is a DCI message.

An example, apparatus for wireless communications, comprising: means for allocating, at a first node, a set of resources in non-continuous time slots to a second node for communication with the first node; means for generating a control message that identifies the set of non-continuous time slots allocated to the second node; and means for transmitting the control message to the second node to schedule a communication in each of the set of non-continuous time slots.

The above example apparatus, wherein the control message identifies a set of slot indices associated with the set of non-continuous time slots allocated to the second node.

Any of the above example apparatus, wherein the control message identifies the set of non-continuous time slots allocated to the second node by including a set of offset values that correspond to each of the set of non-continuous slots relative to a time slot used to transmit the DCI message.

Any of the above example apparatus, wherein the control message identifies the set of non-continuous time slots allocated to the second node by including a set of offset values that correspond to each of the set of non-continuous slots relative to a time slot used for data transmission.

Any of the above example apparatus, wherein the control message identifies the set of non-continuous time slots allocated to the second node by including information associated with time slots that are not allocated to the second node.

Any of the above example apparatus, further comprising: means for allocating a set of acknowledgment (ACK) resources to the second node in order to allow the second node to transmit an ACK message to the first node when the second node successfully decodes the data channel prior to an end of aggregated transmissions from the first node.

Any of the above example apparatus, wherein the set of ACK resources are indicated in one of the DCI or radio resource control (RRC) configured.

Any of the above example apparatus, further comprising: means for scanning the set of ACK resources for the ACK message transmitted by the second node to the first node; and means for terminating transmission with the second node on any subsequent time slots remaining from the set of non-continuous time slots resources that were allocated to the second node for communication with the first node.

Any of the above example apparatus, wherein the means for terminating the transmission between the first node and the second node on any of the subsequent time slots remaining from the set of non-continuous time slots resources allows the second node to utilize the subsequent time slots for communication with a third node.

Any of the above example apparatus, wherein the first node may be an IAB-parent node and the second node may be a IAB-child node, wherein the IAB-child node may be one of a base station, a relay unit (e.g., another IAB-child node), or UE.

Any of the above example apparatus, wherein the control message is a DCI message.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Computer-readable media includes computer storage media, which may be referred to as non-transitory computer-readable media. Non-transitory computer-readable media may exclude transitory signals. Storage media may be any available media that can be accessed by a computer. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
allocating, at a first node, a set of resources in non-continuous time slots to a second node for communication with the first node;
generating a control message that identifies the set of non-continuous time slots allocated to the second node;
transmitting the control message to the second node to schedule a communication in each of the set of non-continuous time slots;
communicating with the second node in one or more of the set of resources in non-continuous time slots that are allocated for communication between the first node and the second node; and
terminating transmission of the communication with the second node on any subsequent time slots remaining from the set of non-continuous time slot resources that were allocated to the second node for communication with the first node in response to receiving an acknowledgment (ACK) message from the second node,
wherein terminating the transmission between the first node and the second node on any of the subsequent time slots remaining from the set of non-continuous time slots resources allows the second node to utilize the subsequent time slots for communication with a third node.

2. The method of claim 1, wherein the control message identifies a set of slot indices associated with the set of non-continuous time slots allocated to the second node.

3. The method of claim 1, wherein the control message identifies the set of non-continuous time slots allocated to the second node by including a set of offset values that correspond to each of the set of non-continuous slots relative to a time slot used to transmit the control message.

4. The method of claim 1, wherein the control message identifies the set of non-continuous time slots allocated to the second node by including a set of offset values that correspond to each of the set of non-continuous slots relative to a previous time slot used for a previous data transmission.

5. The method of claim 1, wherein the control message identifies the set of non-continuous time slots allocated to the second node by including information associated with time slots that are not allocated to the second node.

6. The method of claim 1, wherein generating the control message that identifies the set of non-continuous time slots allocated to the second node, comprises:
selecting an aggregation pattern from a plurality of aggregation patterns that may be preconfigured, and
wherein the control message identifies an index of the aggregation pattern that is selected.

7. The method of claim 6, wherein the plurality of aggregation patterns are either cell-specific patterns or node-specific patterns.

8. The method of claim 7, wherein the plurality of aggregation patterns are indicated to the second node using a multicast or broadcast message when the plurality of aggregation patterns are cell-specific patterns.

9. The method of claim 7, wherein the plurality of aggregation patterns are indicated to the second node using a unicast message when the plurality of aggregation patterns are node-specific patterns.

10. The method of claim 1, further comprising:
allocating a set of acknowledgment (ACK) resources to the second node in order to allow the second node to transmit an ACK message to the first node when the second node successfully decodes the data channel prior to an end of aggregated transmissions from the first node.

11. The method of claim 10, wherein the set of ACK resources are indicated in one of a downlink control information (DCI) message or radio resource control (RRC) configured.

12. The method of claim 10, wherein communicating with the second node includes transmitting the communication to the second node on one of the set of non-continuous time slot resources;
the method further comprising decoding, in one of the set of ACK resources, the ACK message from the second node corresponding to the communication; and
wherein the terminating transmission of the communication with the second node on any subsequent time slots remaining from the set of non-continuous time slot resources that were allocated to the second node for communication with the first node is in response to decoding the ACK message from the second node corresponding to the communication.

13. The method of claim 1, further comprising:
receiving the communication from the second node on one of the set of non-continuous time slot resources scheduled for a multi-slot physical uplink shared channel (PUSCH) from the second node;
allocating a set of acknowledgment (ACK) resources to allow the first node to transmit an ACK message to the second node, wherein the second node monitors the set of ACK resources for the ACK message from the first node corresponding to the communication; and
transmitting the ACK message from the first node to the second node when the first node successfully decodes the data channel prior to an end of aggregated transmissions from the second node.

14. The method of claim 13, wherein the second node utilizes the subsequent time slots for communication with a third node based on detecting the ACK message from the first node.

15. The method of claim 1, wherein the first node is a parent integrated access and backhaul (IAB) node and the second node is a child-IAB node,
wherein the child-IAB node is one of a base station or a user equipment (UE).

16. The method of claim 1, wherein the control message is a downlink control information (DCI) message.

17. An apparatus for wireless communications, comprising:
a memory configured to store instructions; and
a processor communicatively coupled with the memory, the processor configured to execute the instructions to:
allocate, at a first node, a set of resources in non-continuous time slots to a second node for communication with the first node; and
generate a control message that identifies the set of non-continuous time slots allocated to the second node; and a transceiver configured to:
  transmit the control message to the second node to schedule a communication in each of the set of non-continuous time slots;
  communicate with the second node by transmitting or receiving in one or more of the set of resources in non-continuous time slots that are allocated for communication between the first node and the second node; and
  terminate transmission of the communication with the second node on any subsequent time slots remaining from the set of non-continuous time slot resources that were allocated to the second node for communication with the first node in response to receiving an acknowledgment (ACK) message from the second node,
  wherein terminating the transmission between the first node and the second node on any of the subsequent time slots remaining from the set of non-continuous time slots resources allows the second node to utilize the subsequent time slots for communication with a third node.

18. The apparatus of claim 17, wherein the control message identifies a set of slot indices associated with the set of non-continuous time slots allocated to the second node.

19. The apparatus of claim 17, wherein the control message identifies the set of non-continuous time slots allocated to the second node by including a set of offset values that correspond to each of the set of non-continuous slots relative to a time slot used to transmit the control message.

20. The apparatus of claim 17, wherein the control message identifies the set of non-continuous time slots allocated to the second node by including a set of offset values that correspond to each of the set of non-continuous slots relative to a previous time slot used for a previous data transmission.

21. The apparatus of claim 17, wherein the control message identifies the set of non-continuous time slots allocated to the second node by including information associated with time slots that are not allocated to the second node.

22. The apparatus of claim 17, wherein generating the control message that identifies the set of non-continuous time slots allocated to the second node, comprises:
  selecting an aggregation pattern from a plurality of aggregation patterns that may be preconfigured, and
  wherein the control message identifies an index of the aggregation pattern that is selected.

23. The apparatus of claim 22, wherein the plurality of aggregation patterns are either cell-specific patterns or node-specific patterns.

24. The apparatus of claim 23, wherein the plurality of aggregation patterns are indicated to the second node using a multicast or broadcast message when the plurality of aggregation patterns are cell-specific patterns.

25. The apparatus of claim 23, wherein the plurality of aggregation patterns are indicated to the second node using a unicast message when the plurality of aggregation patterns are node-specific patterns.

26. The apparatus of claim 17, wherein the processor is further configured to execute the instructions to allocating a set of acknowledgment (ACK) resources to the second node in order to allow the second node to transmit an ACK message to the first node when the second node successfully decodes the data channel prior to an end of aggregated transmissions from the first node.

27. The apparatus of claim 17, wherein the set of ACK resources are indicated in one of a downlink control information (DCI) message or radio resource control (RRC) configured.

28. A non-transitory computer readable medium storing instructions, executable by a processor, for wireless communications, comprising instructions for:
  allocating, at a first node, a set of resources in non-continuous time slots to a second node for communication with the first node;
  generating a control message that identifies the set of non-continuous time slots allocated to the second node;
  transmitting the control message to the second node to schedule a communication in each of the set of non-continuous time slots;
  communicating with the second node by transmitting or receiving in one or more of the set of resources in non-continuous time slots that are allocated for communication between the first node and the second node; and
  terminating transmission of the communication with the second node on any subsequent time slots remaining from the set of non-continuous time slot resources that were allocated to the second node for communication with the first node in response to receiving an acknowledgment (ACK) message from the second node,
  wherein terminating the transmission between the first node and the second node on any of the subsequent time slots remaining from the set of non-continuous time slots resources allows the second node to utilize the subsequent time slots for communication with a third node.

29. An apparatus for wireless communications, comprising:
  means for allocating, at a first node, a set of resources in non-continuous time slots to a second node for communication with the first node;
  means for generating a control message that identifies the set of non-continuous time slots allocated to the second node;
  means for transmitting the control message to the second node to schedule a communication in each of the set of non-continuous time slots;
  means for communicating with the second node by transmitting or receiving in one or more of the set of resources in non-continuous time slots that are allocated for communication between the first node and the second node; and
  means for terminating transmission of the communication with the second node on any subsequent time slots remaining from the set of non-continuous time slot resources that were allocated to the second node for communication with the first node in response to receiving an acknowledgment (ACK) message from the second node,
  wherein terminating the transmission between the first node and the second node on any of the subsequent time slots remaining from the set of non-continuous time slots resources allows the second node to utilize the subsequent time slots for communication with a third node.

* * * * *